(No Model.)

C. G. PERKINS.
ELECTRIC CURRENT REGULATOR.

No. 274,371. Patented Mar. 20, 1883.

Witnesses:—
Charles Richter
Bernhard Schroeder

Inventor:—
Charles G. Perkins
per Marmaduke M. Slattery
atty

UNITED STATES PATENT OFFICE.

CHARLES G. PERKINS, OF CAMDEN, NEW JERSEY.

ELECTRIC-CURRENT REGULATOR.

SPECIFICATION forming part of Letters Patent No. 274,371, dated March 20, 1883.

Application filed May 10, 1882. (No model.)

*To all whom it may concern:*

Be it known that I, CHARLES G. PERKINS, of the city of Camden, in the county of Camden and State of New Jersey, have invented a new and useful Improvement in Electric-Current Regulators, of which the following is a specification, reference being had to the accompanying drawings, forming a part of the same.

Figure 1:
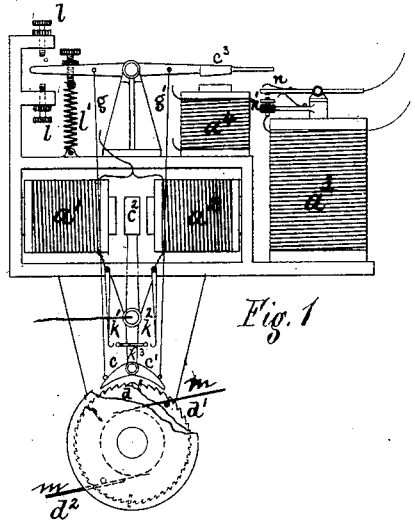
Figure 2:
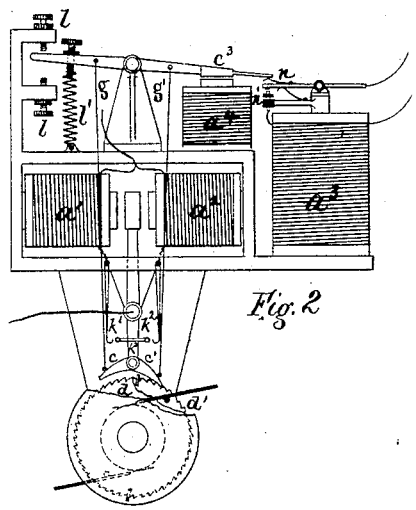
Figure 3:
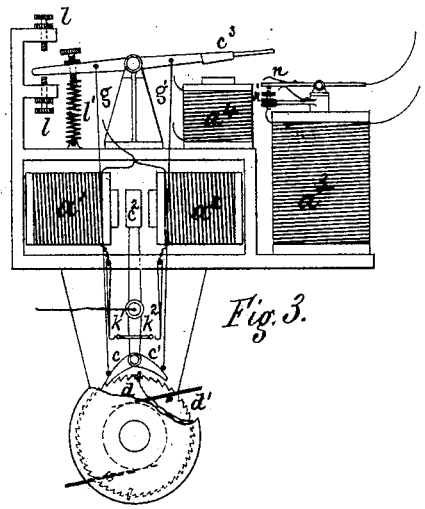
Figure 4:
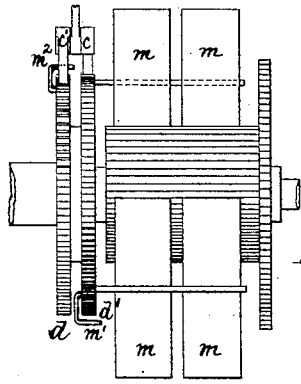

Figure 1 is an end view of the machine, illustrating the arrangement of the controlling and regulating mechanism and automatic shunt-resistance, $a'$ $a^2$ being electro-magnets, which are used for the purpose of alternately attracting the armature $c^2$ in a making and breaking circuit, which gives a movement to the pawls $c$ $c'$, by which the latter, working into ratchet-wheels $d$ $d'$, causes one of them to move in the opposite direction to the other, when necessary, by means of armature $c^3$, as it is influenced by magnet $a^4$ and connecting attachments $g$ $g'$, according to the requirements of the lamp-circuit. The commutator-brushes $m$ $m$, usually employed, are attached to the ratchet-wheels $d$ $d'$, as shown in Fig. 4, in such a manner as to be carried round with them. The ratchet-wheels are rotated from or between the neutral and maximum points of efficiency of the machine, or to any intervening part, according to the demand of the external circuit. Fig. 2 gives the same view as in Fig. 1, but shows the mechanism meeting a demand for an increased strength of current in the lamp-circuit. Fig. 3 shows the regulating mechanism, with the pawl rotating ratchet $d$ in the opposite direction to that shown in Fig. 2. Fig. 4 is a view showing the commutator-brushes $m$ $m$ and the ratchet-wheels $d$ $d'$, with their stop-pins $m'$ $m^2$.

Like letters refer to corresponding parts of the mechanism in each of the drawings.

This improvement is applied to that form of machine called an "electric-current regulator," and is specially adapted for application as an exciter for a dynamo-electric machine, in which the current from the former passes directly through the field-magnets of the latter, the regulator having automatic electro-magnetic mechanism for the purpose of controlling and regulating the electro-motive force through varying resistances in the external circuit of the generator, resulting from an increase or decrease in the number of lamps put in or taken out of circuit, and, further, by a precautionary shunt-resistance arrangement, which acts in the event of a sudden and rapid increase in the electro-motive force by some unforeseen accident, and thereby prevent injury to the lamps, the shunt being automatically put in circuit, and again put out of circuit when the regulating device has had sufficient time to respond to the instantaneous increase in the electro-motive force in the mains.

When the machine is in operation, a small portion of the current is alternately diverted through the magnets $a'$ $a^2$ by the making and breaking mechanism $k'$ $k^2$, the arrangement being of such a nature that at the same time that contact is broken at $k'$ contact is made at $k^2$ by cross-piece $k^3$, and so on alternately. For instance, $a'$ attracting $c^2$, cross-piece $k^3$, having rounded and enlarged ends, is forced over the hook at the end of spring 2, and rests in the hollow of said hook. When armature $c^2$ is attracted by $a^2$, $k^3$ moves toward $k'$; $k^2$, being a spring, is carried by the cross-piece until the latter almost touches $k'$, when $k^2$ springs back again to its place, and thus the action is continued as long as a current is passing through the coils $a'$ $a^2$. The result of this action is, that whichever of the ratchet-wheels $d$ $d'$ pawl $c$ or $c'$ rests upon, that wheel will be rotated, carrying with it the commutator-brushes to that point upon the commutator which will supply a sufficient current to magnetize the field of the generator to a sufficient degree to meet the demands of the lamp-circuit, and the manner in which the variation of resistance is met and controlled by the machine is as follows: Magnet $a^4$ is in a shunted part of the circuit of the lamps. It is thus quickly susceptible to any variation of resistance or electro-motive force in that circuit. Now, when more than one lamp is put in circuit, the resistance of that circuit is lowered. Consequently less current flows through magnet $a^4$ and more through the lamp-circuit. $a^4$ thus losing some of its force, the distance between it and its armature $c^3$ is increased, resulting in the position of the pawls as shown in Fig. 3. It will be seen that the armature $c^2$, oscillating between $a'$ and $a^2$, will then rotate one of the ratchet-wheels, carrying the brushes $m$ $m$ to such a point upon the commutator as will supply the increased current required by the lamp-circuit. When that demand is met the armature $c^3$ is once more attracted by $a^4$, thereby raising pawl $c$ above its wheel, when the brushes will remain stationary. As more lamps are added the action of moving the brushes in the manner described is repeated, until the full efficiency of the machine is arrived at, or until the pawl meets the pin $m'$. These two pins $m'$ $m^2$ are placed in such positions as to meet the pawls when the latter have rotated the brushes $m$ $m$ either to the maximum or neutral points upon the commutator. As the pawl rests upon its pin, it cannot touch the ratchet-wheel to rotate it further.

Should an accident occur whereby a sudden and unnecessary increase in the electro-motive force would result, the armature $c^3$ is drawn toward $a^4$, as seen in Fig. 2, until $c^3$ touches spring-rest $n$, upon which it presses until contact is made at $n'$. $a^3$ may thus be interposed in the field-magnet circuit of the generator, thereby decreasing the electro-motive force in the lamp-circuit. As a result, magnet $a^4$ loses some of its force, when the spring $l'$ will overcome the attractive force of $a^4$ and place $c^3$ in its proper position, the accident in the circuit being meanwhile remedied.

The set-screws $l$ $l$ are for the purpose of regulating the distance that the armature $c^3$ should move, and the spiral spring $l'$ has also a set-screw for regulating its tension according to the magnetic strength at command.

Having thus described my invention, what I claim as new, and desire to secure by Letters Patent, is—

1. In an electric-current regulator, the combination of the electro-magnets $a'$ $a^2$, armature $c^2$, having the pawls $c$ $c'$ and cross-piece $k^3$, said armature playing in a making and breaking circuit, $k'$ $k^2$, with the regulating electro-magnet $a^4$, lever-armature $c^3$, spring $l'$, limiting set-screws $l$ $l$, shunt-resistance $a^3$, pawls and armature attachments $g$ $g'$, and ratchet-wheels $d$ $d'$, substantially as described, and for the purpose set forth.

2. In an electric-current regulator, the combination of the electro-magnets $a'$ $a^2$ and the armature $c^2$, having the cross-piece $k^3$, playing in a making and breaking circuit, $k'$ $k^2$, with the pawls $c$ $c'$ and ratchet-wheels $d$ $d'$, said ratchet-wheels being so connected with the brushes $m$ $m$ of the commutator that these brushes will be carried round with the ratchet-wheels, for the purpose of increasing or decreasing the strength of the current, substantially as set forth.

3. In an electric-current regulator, the combination of the magnets $a'$ $a^2$, armature $c^2$, having cross-piece $k^3$, playing in a making and breaking circuit, $k'$ $k^2$, with the pawls $c$ $c'$ and ratchet-wheels $d$ $d'$, said pawls being connected to armature $c^3$ by the attachments $g$ $g'$, substantially as described, and for the purpose set forth.

4. In an electric-current regulator, the combination of the magnets $a'$ $a^2$, armature $c^2$, having cross-piece $k^3$, playing in a making and breaking circuit, $k'$ $k^2$, the pawls $c$ $c'$ and ratchet-wheels $d$ $d'$, with the attachments $g$ $g'$, the armature $c^3$, spring $l'$, electro-magnet $a^4$, and the set-screws $l$ $l$, arranged and constructed substantially as described.

CHARLES G. PERKINS.

Witnesses:
CHARLES RICHTER,
BERNHARD SCHROEDER.